United States Patent
Makhijani

(10) Patent No.: US 12,468,993 B2
(45) Date of Patent: Nov. 11, 2025

(54) USING TRAINED MODEL TO PREDICT A SUPPLY STATE OF AN ONLINE SYSTEM FOR MANAGING ORDER FULFILLMENTS

(71) Applicant: Maplebear Inc., San Francisco, CA (US)

(72) Inventor: Rahul Makhijani, Daly City, CA (US)

(73) Assignee: Maplebear Inc., San Francisco, CA (US)

( * ) Notice: Subject to any disclaimer, the term of this patent is extended or adjusted under 35 U.S.C. 154(b) by 217 days.

(21) Appl. No.: 18/212,883

(22) Filed: Jun. 22, 2023

(65) Prior Publication Data

US 2024/0428157 A1    Dec. 26, 2024

(51) Int. Cl.
| | |
|---|---|
| G06Q 10/06 | (2023.01) |
| G06Q 10/0631 | (2023.01) |
| G06Q 10/083 | (2023.01) |
| G06Q 10/087 | (2023.01) |
| G06Q 30/0601 | (2023.01) |

(52) U.S. Cl.
CPC ..... *G06Q 10/06315* (2013.01); *G06Q 10/083* (2013.01); *G06Q 10/087* (2013.01); *G06Q 30/0613* (2013.01); *G06Q 30/0635* (2013.01)

(58) Field of Classification Search
CPC ........... G06Q 10/06315; G06Q 10/083; G06Q 10/087; G06Q 30/0613; G06Q 30/0635
See application file for complete search history.

(56) References Cited

U.S. PATENT DOCUMENTS

| | | | | |
|---|---|---|---|---|
| 11,038,808 B1* | 6/2021 | Damani | ................ | H04L 45/745 |
| 11,790,304 B1* | 10/2023 | Zeng | .................... | G06Q 10/109 |
| | | | | 705/338 |
| 2014/0279294 A1* | 9/2014 | Field-Darragh | ......... | H04B 5/77 |
| | | | | 705/28 |

(Continued)

FOREIGN PATENT DOCUMENTS

| | | | | |
|---|---|---|---|---|
| CA | 3134357 A1 * | 10/2020 | ......... | G06F 16/1837 |
| CA | 3149155 A1 * | 3/2021 | ............. | G01K 1/024 |

OTHER PUBLICATIONS

Liu, Xunyun, and Rajkumar Buyya. "D-storm: Dynamic resource-efficient scheduling of stream processing applications." 2017 IEEE 23rd International Conference on Parallel and Distributed Systems (ICPADS). IEEE, 2017. (Year: 2017).*

*Primary Examiner* — Hamzeh Obaid
(74) *Attorney, Agent, or Firm* — Fenwick & West LLP

(57) ABSTRACT

Embodiments are related to using a trained computer model to predict a supply state of an online system for state-aware management of order fulfillments. The online system measures first values of a metric for a set of sample orders. The online system accesses the computer model trained to predict a value of the metric for an order placed with the online system. The online system applies the computer model to predict second values of the metric for the set of sample orders, based on one or more features of each sample order. The online system compares a distribution of the first values to a distribution of the second values and determines the supply state of the online system based on the comparison. Responsive to the determination of the supply state, the online system triggers a remedial action for the online system that adjusts the supply state of the online system.

18 Claims, 4 Drawing Sheets

(56) References Cited

U.S. PATENT DOCUMENTS

| | | | |
|---|---|---|---|
| 2018/0025407 A1* | 1/2018 | Zhang | G06Q 10/02 |
| | | | 705/26.81 |
| 2019/0220785 A1* | 7/2019 | Tanno | G06Q 10/083 |
| 2019/0236740 A1* | 8/2019 | Rao | G06Q 10/06315 |
| 2021/0142274 A1* | 5/2021 | Berk | G06Q 50/12 |
| 2022/0292414 A1* | 9/2022 | Demiralp | G01C 21/3438 |
| 2024/0054550 A1* | 2/2024 | Smith | G10L 15/22 |
| 2024/0210200 A1* | 6/2024 | Anuar | G01C 21/3611 |

* cited by examiner

USING TRAINED MODEL TO PREDICT A SUPPLY STATE OF AN ONLINE SYSTEM FOR MANAGING ORDER FULFILLMENTS

BACKGROUND

Online systems, such as online concierge systems, have supply states that vary over time (e.g., seasonally, over a week, over different times of day, etc.). A supply state of an online concierge system can be measured by a lost demand, time to accept (TTA), or other metrics. A supply state of the conventional online concierge system typically oscillates on a continuous scale between an undersupplied state and an oversupplied state. It is desirable that an online concierge system reacts better on its time-varying supply state. However, the conventional online concierge systems do not have the ability to predict supply states variations and react in real time in order to adjust their supply states.

SUMMARY

Embodiments of the present disclosure are directed to using a trained machine-learning model to predict a supply state of an online concierge system in order to determine whether an oversupply state or undersupply state exists. In response to the determination of the oversupply state or undersupply state, the online concierge system appropriately adjusts parameters of an order fulfillment mechanism, such as routing and/or matching.

In accordance with one or more aspects of the disclosure, an online concierge system receives a set of sample orders placed with an online concierge system. The online concierge system measures a first plurality of values of a metric for the set of sample orders. The online concierge system accesses a computer model of the online concierge system trained to predict a value of the metric for an order placed with the online concierge system. The online concierge system applies the computer model to predict a second plurality of values of the metric for the set of sample orders, based on one or more features of each sample order in the set. The online concierge system compares a first distribution of the first plurality of values to a second distribution of the second plurality of values and determines a state of a supply of the online concierge system, based on the comparison. Responsive to the determination of the state of the supply, the online concierge system triggers a remedial action for the online concierge system that adjusts the state of the supply.

DETAILED DESCRIPTION

Figure 1:
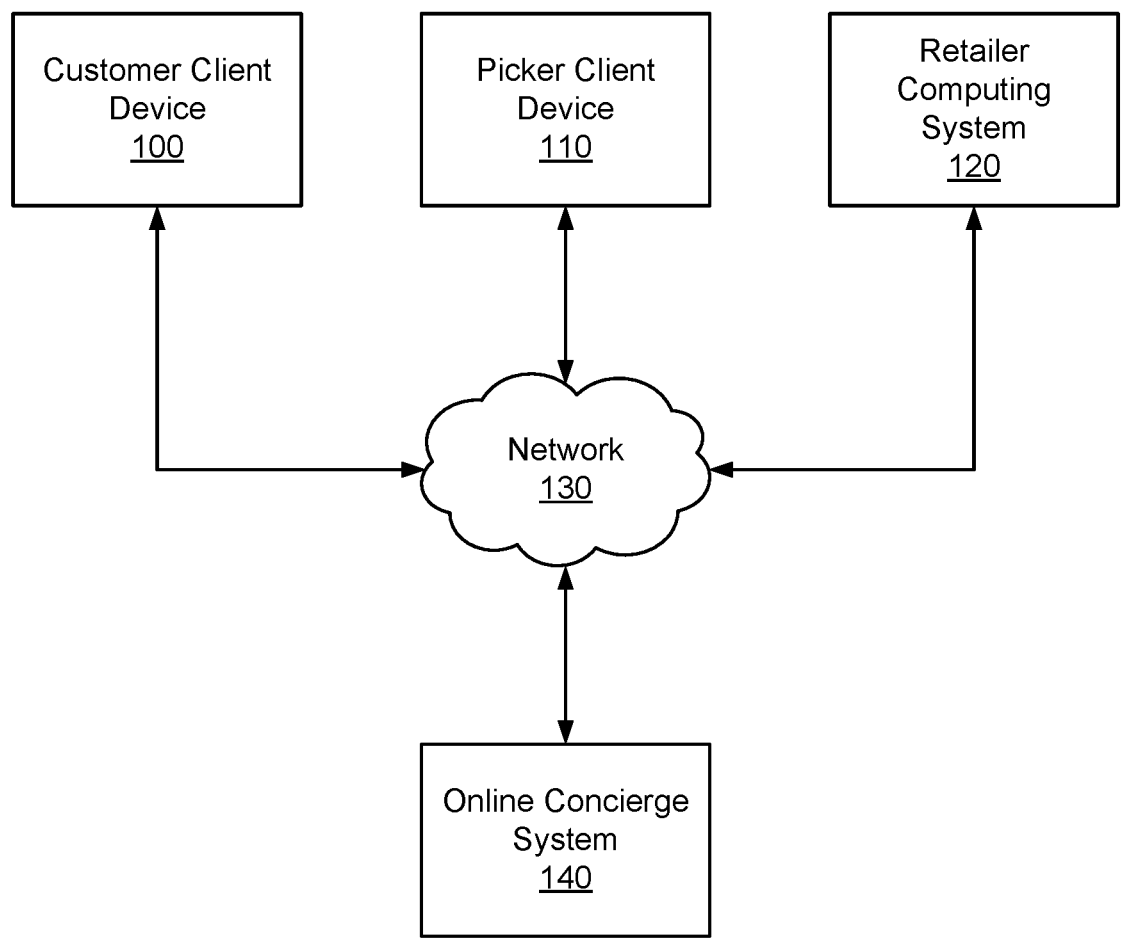
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

In accordance with embodiments of the present disclosure, the online concierge system 140 manages its order fulfillment mechanism based on projected supply and demand states. To correct for states of unexpected oversupply and/or undersupply of pickers, the online concierge system 140 measures a time to accept (TTA) and computes a predicted TTA (e.g., by deploying a trained machine-learning model) for each order in a set of sample orders placed with the online concierge system 140 within a defined time period (e.g., within last 30 minutes, last 60 minutes, last 2 hours, etc.). The TTA can be defined as an amount of time that passes between an order being available to a plurality of pickers associated with the online concierge system 140 and the order being accepted by one of the available pickers. The online concierge system 140 utilizes a TTA as a metric to measure a supply state of the online concierge system 140. By comparing distributions of measured and predicted TTA values, the online concierge system 140 determines whether an oversupply state or undersupply state exists. In response to the determination that the oversupply state or undersupply state exists, the online concierge system 140 adjusts one or more parameters that affect an order fulfillment process, such as routing of orders (including multi-batching), and/or matching of orders to pickers. Alternatively or additionally, in response to the determination that the oversupply state or undersupply state exists, the online concierge system 140 may adjusts one or more parameters that affect pricing of items and/or an action associated with availability of items.

Embodiments of the present disclosure are directed to building an automated policy for the online concierge system 140 that takes into account a supply state of the online concierge system 140 while making order fulfillment decisions. The goal is that the online concierge system 140 makes optimal order fulfillment decisions in case of supply/demand imbalance during intraday periods. More details about this approach are described in relation to FIGS. 2 through 4.

Figure 2:
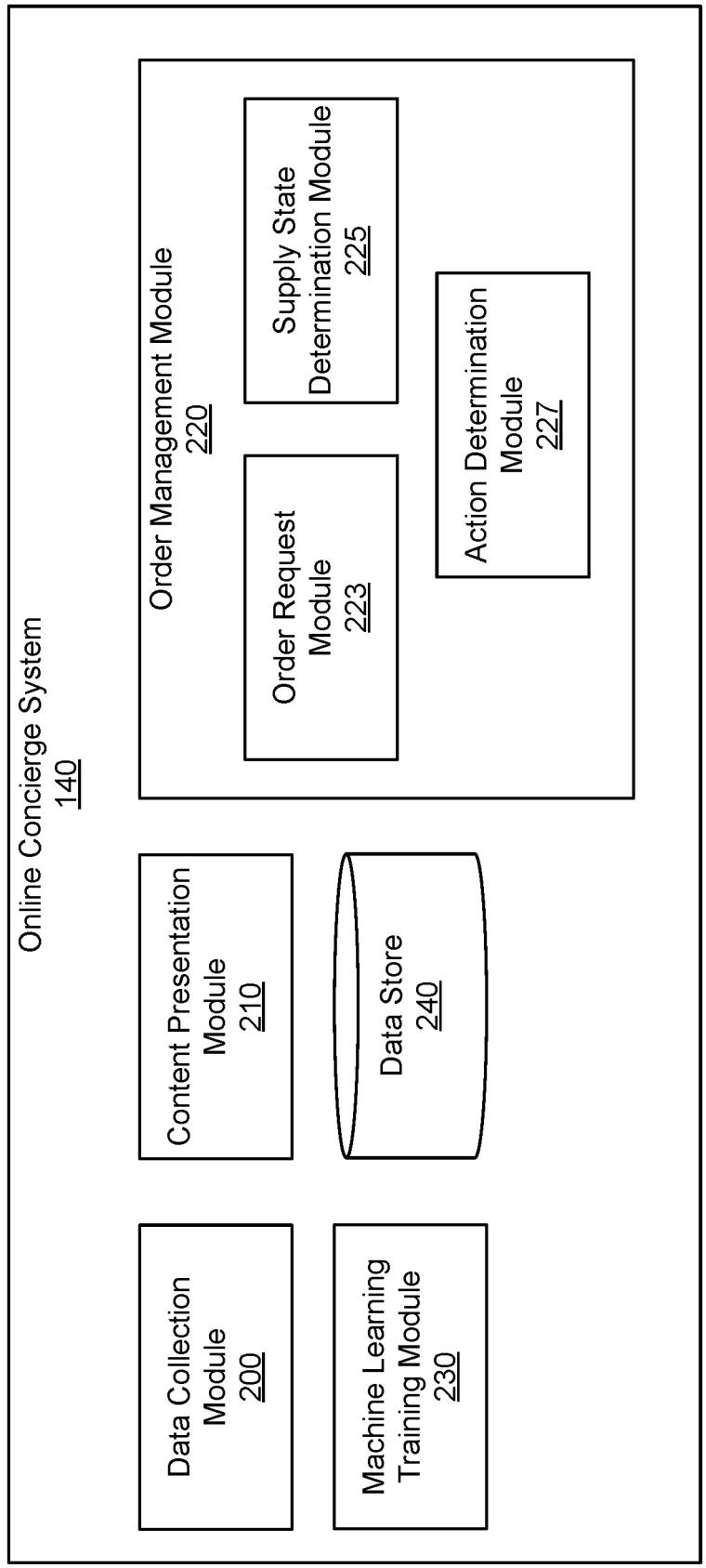
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, and a data store 240. The order management module 220 includes an order request module 223, a supply state determination module 225, and an action determination module 227. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data.

For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The order request module 223 of the order management module 220 receives, from a plurality of customers of the online concierge system 140, a set of sample orders placed with the online concierge system 140. The set of sample orders may be placed by the customers of the online concierge system 140 over a defined time period (e.g., within the last 30 minutes, 1 hour, 2 hours, etc.). In order to avoid a feedback loop of measuring the effect of actions of the online concierge system 140, each received sample order may be associated with a priority service delivery. The order request module 223 may receive the set of sample orders from customer client devices 100 via the network 130. The order request module 223 may extract (e.g., in communication with one or more other modules of the online concierge system 140, such as the data store 240) one or more features for each received sample order, and provide the extracted features as inputs to, e.g., a machine-learning computer model deployed by the supply state determination module 225.

Figure 3:
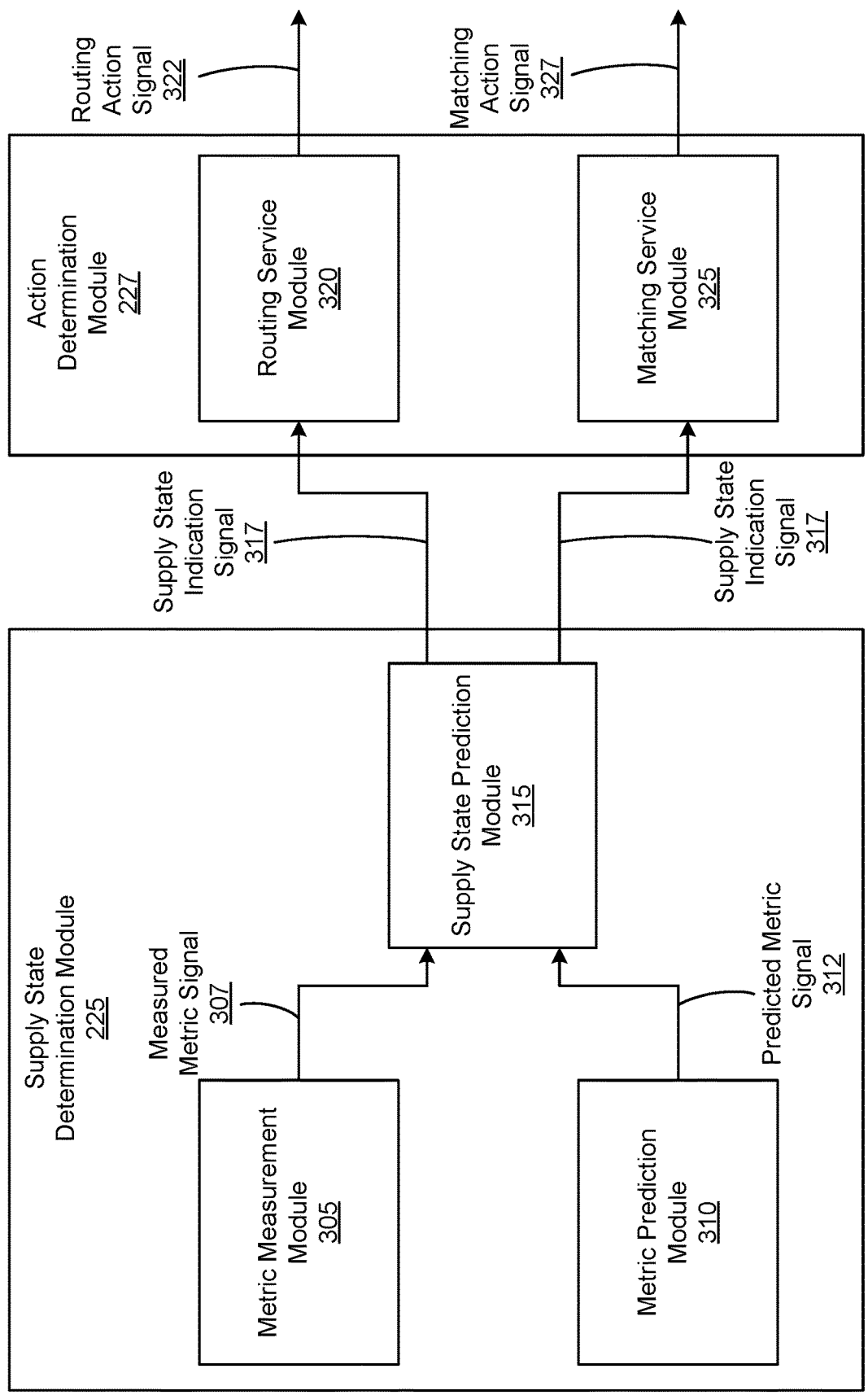
FIG. 3 illustrates an example system architecture for a supply state determination module of an online concierge system having an output connected to inputs of an action determination module of the online concierge system, in accordance with one or more embodiments.

The supply state determination module 225 of the order management module 220 determines a state of a supply of the online concierge system 140. FIG. 3 illustrates an example detailed system architecture for the supply state determination module 225 having an output connected to inputs of the action determination module 227, in accordance with one or more embodiments. The supply state determination module 225 may include a metric measurement module 305, a metric prediction module 310, and a supply state prediction module 315. The action determination module 227 may include a routing service module 320 and a matching service module 325. Alternative embodiments may include more, fewer, or different components from those illustrated in FIG. 3, and the functionality of each component may be divided between the components differently from the description below. Additionally, each component may perform their respective functionalities in response to a request from a human, or automatically without human intervention.

The metric measurement module 305 measures a value of a metric (e.g., TTA) for each received sample order from the set of sample orders. The metric measurement module 305 may measure a TTA for each received sample order as a difference between an order accept time and an order assigned time, where the order assigned time represents an earliest time an order is made available to any picker associated with the online concierge system 140. Sample orders (e.g., priority orders) created within a defined time period (e.g., in the last 60 minutes) may be used for the real time TTA measurements by the metric measurement module 305. The metric measurement module 305 may send a measured metric signal 307 to the supply state prediction module 315, wherein the measured metric signal 307 includes values of the metric for the set of sampled orders measured over the defined time period (e.g., time series of measured TTA values).

The metric prediction module 310 predicts a value for the metric (e.g., TTA) for each sample order in a set of sample orders. The set of sample orders used by the metric prediction module 310 may be the same as the set of sample orders used by the metric measurement module 305. Alternatively, the set of sample orders used by the metric prediction module 310 may be different than the set of sample orders used by the metric measurement module 305. The metric prediction module 310 may apply a computer model trained to predict a value of the metric (e.g., TTA) for an order placed with the online concierge system 140. The trained computer model deployed by the metric prediction module 310 may run a machine-learning algorithm to predict values of the metric (e.g., TTA values) for the set of sample orders, based on one or more features of each sample order in the set of sample orders. The set of sample orders utilized by the metric prediction module 310 may include a set of priority orders in a given zone created within a defined time period (e.g., within the last 30 minutes, 60 minutes, or 2 hours). The computer model deployed by the metric prediction module 310 may predict a TTA for each sample order at a zonal level using, e.g., the TTA machine-learning model. A set of parameters for the computer model may be stored on one or more non-transitory computer-readable media of the metric prediction module 310. Alternatively, the set of parameters for the computer model may be stored on one or more non-transitory computer-readable media of the data store 240.

The metric prediction module 310 may provide one or more inputs to the computer model, e.g., as obtained from the order request module 223, the data store 240, or some other module of the online concierge system 140. The one or more inputs to the computer model may include one or more features of each sample order. The features of the sample order may include: a monetary value of the sample order, information about a weight of each item in the sample order, a delivery distance associated with the sample order, a total number of items in the sample order, a quantity of each item type in the sample order, information about a warehouse (or store) associated with the sample order, information about a service option for delivery of the sample order (e.g., priority delivery or standard delivery), an indication of RX (pharmacy/prescription) delivery (if any) associated with the sample order, an indication of alcohol delivery (if any) associated with the sample order, a driving distance (e.g., average and/or median driving distance) for a picker associated with the online concierge system 140 who accepted the sample order. The metric prediction module 310 may send a predicted metric signal 312 to the supply state prediction module 315, wherein the predicted metric signal 312 includes predicted values of the metric for the set of sampled orders that were placed over the defined time period (e.g., time series of predicted TTA values).

Note that neglecting unaccepted orders when predicting values of the metric (e.g., TTA values) can lead to a bias (e.g., underestimate) of metric estimates (e.g., TTA estimates), which can lead to an incorrect prediction for a supply state of the online concierge system 140. In one or more embodiments, the metric prediction module 310 utilizes the censored regression algorithm to obtain estimated values for the metric (e.g., TTA estimates) for unaccepted orders. In one or more other embodiments, the metric prediction module 310 applies the maximum likelihood estimation correction algorithm to obtain estimated values for the metric (e.g., TTA estimates) for unaccepted orders. In one or more other embodiments, the metric prediction module 310 utilizes the heuristic algorithm to obtain estimated values for the metric (e.g., TTA estimates) for unaccepted orders. In these cases, the metric prediction module 310 may estimate a TTA for an unaccepted order as:

$$TTA(\text{estimate}) = \frac{\text{Average } TTA}{\text{Average predicted } TTA} * \text{predicted } TTA, \quad (1)$$

where Average TTA is an average value of TTAs for the set of sample orders as measured by the metric measurement module 305, predicted TTA is a TTA for the unaccepted order as predicted by the computer model, and Average predicted TTA is an average value of TTAs for the set of sample orders as predicted by the computer model.

The supply state prediction module 315 determines a state of a supply of the online concierge system 140 based on the measured metric signal 307 and the predicted metric signal 312. The state of the supply of the online concierge system 140 may be represented by a supply state indication signal 317 that is output by the supply state prediction module 315. The supply state indication signal 317 may have a value (e.g., binary value) that indicates the supply state of the online concierge system 140, i.e., a first value that indicates an undersupplied state (e.g., represented with the binary value of "01"), a second value that indicates an oversupplied state (e.g., represented with the binary value of "10") and a third value that indicates a normal supply state (e.g., represented with the binary value of "11"). Alternatively, the supply state indication signal 317 may have a range of signal values (e.g., between −1 and +1) that indicates the supply state of the online concierge system 140 with an additional granularity. For example, the supply state indication signal 317 having a signal value in a defined vicinity of "−1" may indicate the undersupplied state with the signal value equal to "−1" indicates an "extremely undersupplied state". Similarly, the supply state indication signal 317 having a signal value in a defined vicinity of "+1" may indicate the oversupplied state with the signal value equal to "+1" indicating an "extremely oversupplied state". And the supply state indication signal 317 having a signal value in a vicinity of "0" may indicate the normal supply state.

To determine the state of the supply of the online concierge system 140, the supply state prediction module 315 measures a difference between a distribution of the measured metric values (e.g., time series of measured TTAs) in the measured metric signal 307 over a defined time period (e.g., within the last 1 hour) and a distribution of the predicted metric values (e.g., time series of predicted TTAs) in the predicted metric signal 312 over the defined time period. Hence, the supply state prediction module 315 compares trends of the measured and predicted metric values (e.g., trends in the time series of measured and predicted TTA values) over the defined time period to generate the supply state indication signal 317.

In one or more embodiments, the supply state prediction module 315 applies the time series decomposition algorithm to compare the distribution of the measured metric values in the measured metric signal 307 with the distribution of the predicted metric values in the predicted metric signal 312. In such cases, the supply state prediction module 315 may decompose each of the measured metric signal 307 and the predicted metric signal 312 (e.g., each of the time series of measured and predicted TTA values) to obtain a trend over the defined time period for each of the measured metric signal 307 and the predicted metric signal 312. The supply state prediction module 315 may then calculate a difference between a first trend of the measured metric signal 307 and a second trend of the predicted metric signal 312 to determine information about the supply state of the online concierge system 140. In order to generate the supply state indication signal 317, the supply state prediction module 315 may the compare the calculated distribution difference to threshold values that define boundaries of different supply states (e.g., a boundary between the normal and oversupplied states, and a boundary between the normal and undersupplied states). To determine the threshold values, the supply state prediction module 315 may first determine a difference between trends of the measured metric signal 307 and the predicted metric signal 312 over a longer time period (e.g., over a 24-hour period, a week, a month, etc.) and then calculate the threshold values as corresponding percentile values (i.e., P-values) of the difference (e.g., P-70 value, and P-50 value).

In one or more other embodiments, the supply state prediction module 315 applies the density difference estimation algorithm to compare the distribution of the measured metric values in the measured metric signal 307 with the distribution of the predicted metric values in the predicted metric signal 312. In such cases, the supply state prediction module 315 may apply the least squares density estimation algorithm on the measured metric signal 307 and the predicted metric signal 312 (e.g., on the time series of measured and predicted TTA values) to determine a difference between the distributions of the measured and predicted metric values. In order to generate the supply state indication signal 317, the supply state prediction module 315 may the compare the determined distribution difference with threshold values that define boundaries of different supply states (e.g., a boundary between the normal and oversupplied states and a boundary between the normal and undersupplied states). To determine the threshold values, the supply state prediction module 315 may first determine a difference between trends of the measured metric signal 307 and the predicted metric signal 312 over a longer time period (e.g., over a 24-hour period, a week, a month, etc.) and then calculate the threshold values as corresponding P-values of the difference (e.g., P-70 value, and P-50 value). The supply state prediction module 315 may send the generated supply state indication signal 317 to the action determination module 227, i.e., to the routing service module 320 and the matching service module 325 of the action determination module 227.

The action determination module 227 of the order management module 220 determines an appropriate remedial action for the online concierge system in response to the supply state indication signal 317. The routing service module 320 of the action determination module 227 generates (e.g., via a machine-learning model), based on the supply state indication signal 317, a routing action signal 322 that triggers an appropriate action associated with how a routing at the online concierge system 140 is performed. The routing is a mechanism at the online concierge system 140 that defines combining of orders (e.g., multi-batching) where multiple orders are combined for overlapping fulfillments by a single picker (i.e., routing of multiple orders towards a single picker). By generating an appropriate routing action signal 322 based on the supply state indication signal 317, the routing service module 320 may trigger an adjustment in a number (or percentage) of orders that are being combined for overlapping fulfillment (e.g., adjustment of an amount of multi-batching).

In one or more embodiments, in the case of the supply state indication signal 317 indicating the undersupply state, the routing service module 320 may generate the routing action signal 322 that increases the amount of multi-batching by decreasing a threshold of relative savings per lateness minute (e.g., from 10c/min to 5c/min) for the online concierge system 140. The information about the decreased threshold of savings may be communicated to pickers associated with the online concierge system 140, e.g., from the content presentation module 210 via the network 130 to be displayed by user interfaces of the picker client devices 110. In one or more other embodiments, in the case of the supply state indication signal 317 indicating the undersupply state, the routing service module 320 may generate the routing action signal 322 that triggers an adjustment of a peak time pay for pickers associated with the online concierge system 140. The peak time pay is a mechanism of the online concierge system 140 under which a picker's shopper pay is adjusted at different hour blocks. Information about the peak time pay may be communicated to pickers, e.g., from the content presentation module 210 via the network 130 to be displayed by user interfaces of the picker client devices 110.

The matching service module 325 of the action determination module 227 determines (e.g., via a machine-learning model), based on the supply state indication signal 317, a matching action signal 327 that triggers an appropriate action associated with how a matching at the online concierge system 140 is performed. The matching is a mechanism at the online concierge system 140 that defines a level of availability of pickers for viewing and accepting an order placed with the online concierge system 140 (e.g., matching of an order to a group of available pickers that can view and accept the order). By generating an appropriate matching action signal 327 based on the supply state indication signal 317, the matching service module 325 may trigger an adjustment in a number of pickers who are available to view and accept an order placed with the online concierge system 140.

In the case when the supply state indication signal 317 indicates the undersupply state, the matching service module 325 generates the matching action signal 327 that may trigger the content presentation module 210 to communicate (e.g., via the network 130) information about a placed order to more pickers, wherein the information about the placed order is shown at user interfaces of a greater number of the picker client devices 110. In the case when the supply state indication signal 317 indicates the oversupply state, the matching service module 325 generates the matching action signal 327 that may trigger the content presentation module 210 to communicate (e.g., via the network 130) information about a placed order to less pickers, wherein the information about the placed order is shown at user interfaces of a smaller number of the picker client devices 110. In one or more embodiments, the matching service module 325 generates the matching action signal 327 that adjusts a minimum number of pickers an order is shown to. In one or more other embodiments, the matching service module 325 generates the matching action signal 327 that adjusts a maximum number of pickers an order is shown to. In yet another embodiment, the matching service module 325 generates the matching action signal 327 that adjusts an isochrone expansion rate, i.e., a rate of expansion of an area that encompasses pickers available to view and accept an order.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The machine-learning training module 230 trains the computer model that is deployed by the supply state determination module 225. The machine-learning training module 230 may utilize training data (e.g., from the data store 240) to train the computer model. The training data may include real-time features for a set of orders that provide real-time supply state information. In some embodiments, the machine-learning training module 230 trains the computer model using TTA values of single priority orders (i.e., priority orders without any multi-batching). Note that the TTA values of single priority orders tends to be lower and are affected by supply boosting and supply partitioning. In one or more embodiments, machine-learning training module 230 trains the computer model using median TTA values of multiple sets of training orders. Note that the median TTA values are suitable for training of the computer model since the median TTA values are more robust to outliers (e.g., TTA values of orders that have low average hourly rates).

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 4:
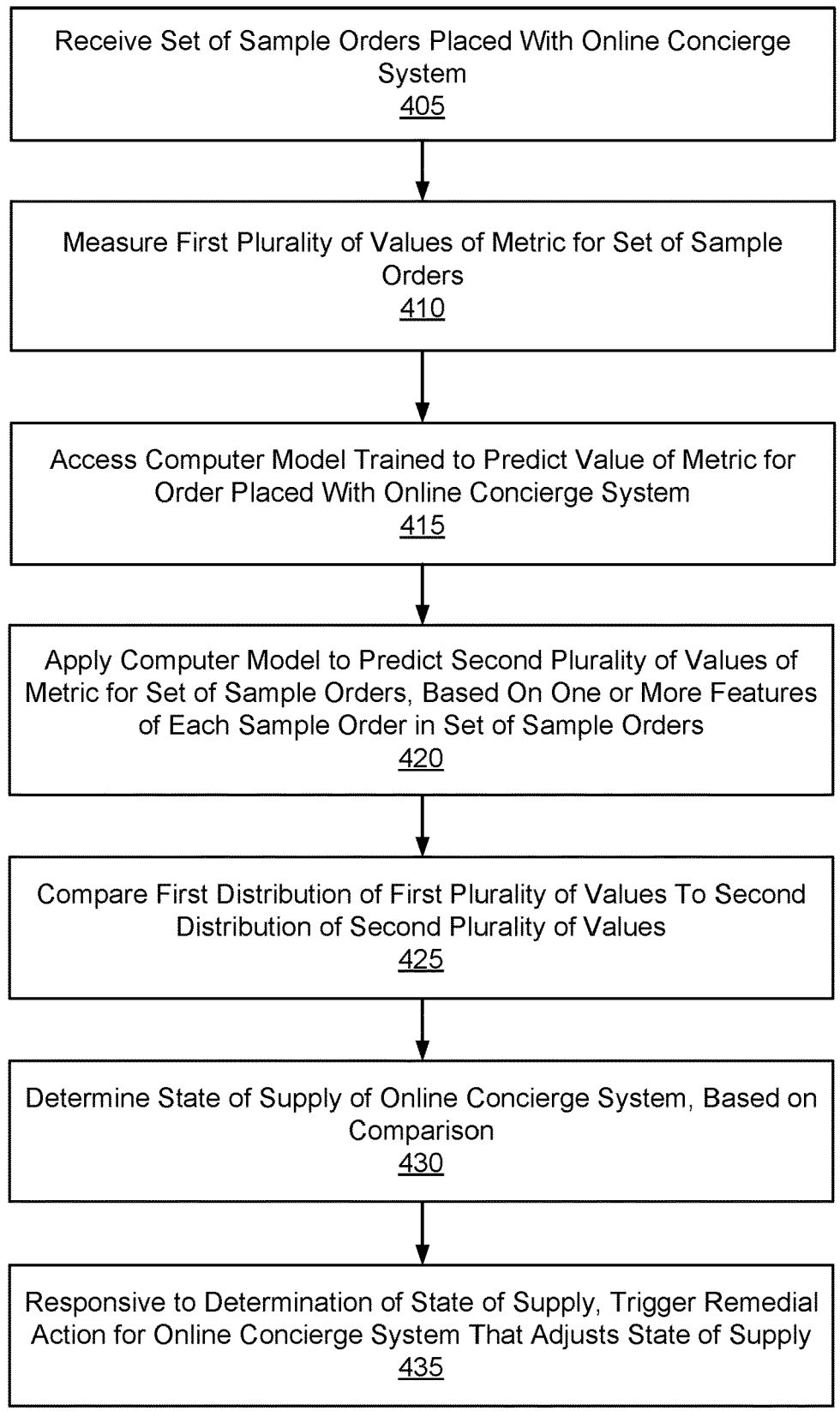
FIG. 4 is a flowchart of a method of using a trained computer model to predict a supply state of an online concierge system for a state-aware management of order fulfillments, in accordance with one or more embodiments.

FIG. 4 is a flowchart of a method of using a trained computer model to predict a supply state of an online concierge system for a state-aware management of order fulfillments, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 receives 405 (e.g., via the order request module 223) a set of sample orders placed with the online concierge system 140. The online concierge system 140 measures 410 (e.g., via the supply state determination module 225) a first plurality of values of a metric (e.g., real TTA values) for the set of sample orders. The online concierge system 140 may measure (e.g., via the supply state determination module 225), for each sample order in the set, a value of the first plurality of values as an amount of time for a picker of a plurality of pickers associated with the online concierge system 140 to accept that sample order once that sample order is made available to the plurality of pickers.

The online concierge system 140 accesses 415 a computer model of the online concierge system 140 (e.g., via the supply state determination module 225) trained to predict a value of the metric for an order placed with the online concierge system. The online concierge system 140 applies 420 (e.g., via the supply state determination module 225) the computer model to predict a second plurality of values of the metric (e.g., predicted TTA values) for the set of sample orders, based on one or more features of each sample order in the set. The online concierge system 140 may predict, by the computer model, a value of the second plurality of values for each sample order in the set by estimating an amount of time for a picker of a plurality of pickers associated with the online concierge system 140 to accept that sample order once the sample order is made available to the plurality of pickers. The online concierge system 140 may predict, by the computer model, each of the second plurality of values of the metric as a TTA value predicted for a respective sample order from the set of sample orders.

The one or more features of each sample order that are input to the computer model may comprise at least one of: a monetary value of that sample order, information about a weight of each item in that sample order, a delivery distance associated with that sample order, a total number of items in that sample order, a quantity of each item type in that sample order, information about a warehouse associated with that sample order, information about a service option for delivery of that sample order, or a driving distance for a picker associated with the online concierge system who accepted that sample order. The online concierge system 140 may train the computer model (e.g., via the machine-learning training module 230) using a plurality of measured values of the metric for a plurality of training orders and one or more features for each of the plurality of training orders.

The online concierge system 140 compares 425 (e.g., via the supply state determination module 225) a first distribution of the first plurality of values to a second distribution of the second plurality of values. The online concierge system 140 determines 430 (e.g., via the supply state determination module 225) a state of a supply of the online concierge system, based on the comparison. In one or more embodiments, the online concierge system 140 decomposes (e.g., via the supply state determination module 225) the first plurality of values using a time series decomposition to obtain information about a first trend over a time period for the first distribution. The online concierge system 140 may decompose (e.g., via the supply state determination module 225) the second plurality of values using the time series decomposition to obtain information about a second trend over the time period for the second distribution. The online concierge system 140 may determine (e.g., via the supply state determination module 225) the state of the supply of the online concierge system based on a difference between the first trend and the second trend. In one or more other embodiments, the online concierge system 140 performs (e.g., via the supply state determination module 225) a density difference estimation of the first plurality of values and the second plurality of values by applying a least squares density estimation algorithm on the first plurality of values and the second plurality of values. The online concierge system 140 may determine the state of the supply of the online concierge system, based on the density difference estimation.

Responsive to the determination of the state of the supply, the online concierge system 140 triggers 435 (e.g., via the action determination module 227) a remedial action for the online concierge system 140 that adjusts the state of the supply. Responsive to the determination of the state of the supply, the online concierge system 140 may adjust (e.g., via the action determination module 227) a number of combined orders available for acceptance by a picker associated with the online concierge system 140, each of the combined orders being fulfilled during overlapping time periods. Alternatively or additionally, responsive to the determination of the state of the supply, the online concierge system 140 may adjust (e.g., via the action determination module 227) a number of pickers associated with the online concierge system 140 who are available to view and accept one or more orders placed with the online concierge system 140.

Embodiments of the present disclosure are directed to training and deploying a machine-learning computer model to predict a supply state of the online concierge system 140 in order to determine whether an over or under supply state exists. The trained computer model predicts values of the metric (e.g., TTA values) for a set of sample orders, and the online concierge system 140 compares the predicted TTA values with measured TTA values to determine a supply state of the online concierge system 140. In response to determining that the oversupply or undersupply state exists, the online concierge system 140 adjusts one or more parameters of an order fulfillment mechanism. In the case of the oversupply state, the online concierge system 140 adjusts the parameters to minimize a cost when there is an excess supply capacity. In the case of the oversupply state, the online concierge system 140 adjusts the parameters to maximize availability of orders via increasing a supply throughput when there is an excess demand.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network and from a first set of devices associated with a first set of users of an online system, a first set of sample orders placed by the first set of users at the online system;

receiving, via the network and from a second set of devices associated with a second set of users of the online system, a second set of sample orders placed by the second set of users at the online system;

measuring a first set of values of a metric for the first set of sample orders by computing a difference between a first time each sample order from the first set of sample orders was accepted for servicing and a second time each sample order from the first set of sample orders was made available for viewing and acceptance;

accessing a machine-learning model of the online system, wherein the machine-learning model is trained to predict a value of the metric for an order placed at the online system;

applying the machine-learning model to one or more features of each sample order from the second set of sample orders to generate a second set of values of the metric for the second set of sample orders, each value from the second set of values of the metric indicative of a difference between a predicted time each sample order from the second set of sample orders will be accepted for servicing and a time each sample order from the second set of sample orders is made available for viewing and acceptance;

comparing a first distribution of the first set of values to a second distribution of the second set of values;

generating, based on a result of comparing the first distribution to the second distribution, a supply state indication signal with information about a state of a supply of the online system;

generating, using the supply state indication signal, a matching action signal that triggers an adjustment of a first set of pickers who are available for accepting one or more orders placed at the online system into a second set of pickers who are available for accepting the one or more orders, wherein each picker of the first set of pickers and the second set of pickers is a fully-autonomous robot; and responsive to the matching action signal, communicating, via the network, information about the one or more orders to a set of devices associated with the second set of pickers causing each device from the set of devices to display a user interface with the information about the one or more orders, displaying the user interface causes communicating the information about the one or more orders causing a corresponding picker from the second set of pickers operating as the fully-autonomous robot to collect in a retailer location items for an order of the one or more orders.

2. The method of claim 1, further comprising:
measuring, for each sample order in the first set of sample orders, a value of the first set of values as an amount of time for a picker of the first set of pickers to accept each sample order once each sample order is made available to the first set of pickers.

3. The method of claim 1, wherein applying the machine-learning model comprises:
applying the machine-learning model to generate a value of the second set of values for each sample order in the second set of sample orders by estimating an amount of time for a picker of the first set of pickers to accept each sample order once each sample order is made available to the first set of pickers.

4. The method of claim 1, wherein applying the machine-learning model comprises:
applying the machine-learning model to generate each value of the second set of values of the metric as a time to accept (TTA) a respective sample order from the second set of sample orders.

5. The method of claim 1, wherein the one or more features of each sample order input into the machine-learning model comprise at least one of: a monetary value of each sample order, information about a weight of each item in each sample order, a delivery distance associated with each sample order, a total number of items in each sample order, a quantity of each item type in each sample order, information about a warehouse associated with each sample order, information about a service option for delivery of each sample order, or a driving distance for a picker who accepted each sample order.

6. The method of claim 1, further comprising:
generating a set of parameters of the machine-learning model by training the machine-learning model using a plurality of measured values of the metric for a plurality of training orders and one or more features for each of the plurality of training orders; and
updating, using the result of comparing the first distribution to the second distribution, the set of parameters of the machine-learning model.

7. The method of claim 1, wherein generating the supply state indication signal comprises:
decomposing the first set of values using a time series decomposition to obtain information about a first trend over a time period for the first distribution;
decomposing the second set of values using the time series decomposition to obtain information about a second trend over the time period for the second distribution; and
generating, using a difference between the first trend and the second trend, the supply state indication signal with the information about the state of the supply of the online system.

8. The method of claim 1, wherein generating the supply state indication signal comprises:
performing a density difference estimation of the first set of values and the second set of values by applying a least squares density estimation algorithm on the first set of values and the second set of values; and
generating, using a result of the density difference estimation, the supply state indication signal with the information about the state of the supply of the online system.

9. The method of claim 1, further comprising:
adjusting, using the supply state indication signal, a number of combined orders available for acceptance by a picker, each of the combined orders being fulfilled during overlapping time periods.

10. A computer program product comprising a non-transitory computer readable storage medium having instructions encoded thereon that, when executed by a processor, cause the processor to perform steps comprising:
receiving, via a network and from a first set of devices associated with a first set of users of an online system, a first set of sample orders placed by the first set of users at the online system;
receiving, via the network and from a second set of devices associated with a second set of users of the online system, a second set of sample orders placed by the second set of users at the online system;
measuring a first set of values of a metric for the first set of sample orders by computing a difference between a first time each sample order from the first set of sample orders was accepted for servicing and a second time each sample order from the first set of sample orders was made available for viewing and acceptance;
accessing a machine-learning model of the online system, wherein the machine-learning model is trained to predict a value of the metric for an order placed at the online system;
applying the machine-learning model to one or more features of each sample order from the second set of sample orders to generate a second set of values of the metric for the second set of sample orders, each value from the second set of values of the metric indicative of a difference between a predicted time each sample order from the second set of sample orders will be accepted for servicing and a time each sample order from the second set of sample orders is made available for viewing and acceptance;
comparing a first distribution of the first set of values to a second distribution of the second set of values;
generating, based on a result of comparing the first distribution to the second distribution, a supply state indication signal with information about a state of a supply of the online system;
generating, using the supply state indication signal, a matching action signal that triggers an adjustment of a first set of pickers who are available for accepting one or more orders placed at the online system into a second set of pickers who are available for accepting the one or more orders, wherein each picker of the first set of pickers and the second set of pickers is a fully-autonomous robot; and
responsive to the matching action signal, communicating, via the network, information about the one or more orders to a set of devices associated with the second set of pickers causing each device from the set of devices to display a user interface with the information about the one or more orders, displaying the user interface causes communicating the information about the one or more orders causing a corresponding picker from the second set of pickers operating as the fully-autonomous robot to collect in a retailer location items for an order of the one or more orders.

11. The computer program product of claim 10, wherein the instructions further cause the processor to perform steps comprising:
measuring, for each sample order in the first set of sample orders, a value of the first set of values as an amount of time for a picker of the first set of pickers to accept each sample order once each sample order is made available to the first set of pickers.

12. The computer program product of claim 10, wherein the instructions further cause the processor to perform steps comprising:
applying the machine-learning model to generate a value of the second set of values for each sample order in the second set of sample orders by estimating an amount of time for a picker of the first set of pickers to accept each sample order once each sample order is made available to the first set of pickers.

13. The computer program product of claim 10, wherein the one or more features of each sample order input into the machine-learning model comprise at least one of: a monetary value of each sample order, information about a weight of each item in each sample order, a delivery distance associated with each sample order, a total number of items in each sample order, a quantity of each item type in each sample order, information about a warehouse associated with each sample order, information about a service option for delivery of each sample order, or a driving distance for a picker who accepted each sample order.

14. The computer program product of claim 10, wherein the instructions further cause the processor to perform steps comprising:
   generating a set of parameters of the machine-learning model by training the machine-learning model using a plurality of measured values of the metric for a plurality of training orders and one or more features for each of the plurality of training orders; and
   updating, using the result of comparing the first distribution to the second distribution, the set of parameters of the machine-learning model.

15. The computer program product of claim 10, wherein the instructions further cause the processor to perform steps comprising:
   decomposing the first set of values using a time series decomposition to obtain information about a first trend over a time period for the first distribution;
   decomposing the second set of values using the time series decomposition to obtain information about a second trend over the time period for the second distribution; and
   generating, using a difference between the first trend and the second trend, the supply state indication signal with the information about the state of the supply of the online system.

16. The computer program product of claim 10, wherein the instructions further cause the processor to perform steps comprising:
   performing a density difference estimation of the first set of values and the second set of values by applying a least squares density estimation algorithm on the first set of values and the second set of values; and
   generating, using a result of the density difference estimation, the supply state indication signal with the information about the state of the supply of the online system.

17. The computer program product of claim 10, wherein the instructions further cause the processor to perform steps comprising:
   adjusting, using the supply state indication signal, a number of combined orders available for acceptance by a picker, each of the combined orders being fulfilled during overlapping time periods.

18. A computer system comprising:
   a processor; and
   a non-transitory computer-readable storage medium having instructions that, when executed by the processor, cause the computer system to perform steps comprising:
      receiving, via a network and from a first set of devices associated with a first set of users of an online system, a first set of sample orders placed by the first set of users at the online system;
      receiving, via the network and from a second set of devices associated with a second set of users of the online system, a second set of sample orders placed by the second set of users at the online system;
      measuring a first set of values of a metric for the first set of sample orders by computing a difference between a first time each sample order from the first set of sample orders was accepted for servicing and a second time each sample order from the first set of sample orders was made available for viewing and acceptance;
      accessing a machine-learning model of the online system, wherein the machine-learning model is trained to predict a value of the metric for an order placed at the online system;
      applying the machine-learning model to one or more features of each sample order from the second set of sample orders to generate a second set of values of the metric for the second set of sample orders, each value from the second set of values of the metric indicative of a difference between a predicted time each sample order from the second set of sample orders will be accepted for servicing and a time each sample order from the second set of sample orders is made available for viewing and acceptance;
      comparing a first distribution of the first set of values to a second distribution of the second set of values;
      generating, based on a result of comparing the first distribution to the second distribution, a supply state indication signal with information about a state of a supply of the online system;
      generating, using the supply state indication signal, a matching action signal that triggers an adjustment of a first set of pickers who are available for accepting one or more orders placed at the online system into a second set of pickers who are available for accepting the one or more orders, wherein each picker of the first set of pickers and the second set of pickers is a fully-autonomous robot; and
      responsive to the matching action signal, communicating, via the network, information about the one or more orders to a set of devices associated with the second set of pickers causing each device from the set of devices to display a user interface with the information about the one or more orders, displaying the user interface causes communicating the information about the one or more orders causing a corresponding picker from the second set of pickers operating as the fully-autonomous robot to collect in a retailer location items for an order of the one or more orders.

* * * * *